US011054891B2

(12) United States Patent
Popovich et al.

(10) Patent No.: US 11,054,891 B2
(45) Date of Patent: Jul. 6, 2021

(54) RESONANCE AWARE PERFORMANCE MANAGEMENT

(71) Applicant: Google LLC, Mountain View, CA (US)

(72) Inventors: Mikhail Popovich, Danville, CA (US); Gregory Sizikov, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 181 days.

(21) Appl. No.: 16/408,088

(22) Filed: May 9, 2019

(65) Prior Publication Data
US 2020/0356158 A1 Nov. 12, 2020

(51) Int. Cl.
G06F 1/32 (2019.01)
G06F 1/06 (2006.01)
G06F 1/10 (2006.01)
G06F 1/3296 (2019.01)
G06F 1/08 (2006.01)

(52) U.S. Cl.
CPC .............. *G06F 1/3296* (2013.01); *G06F 1/06* (2013.01); *G06F 1/08* (2013.01); *G06F 1/10* (2013.01)

(58) Field of Classification Search
CPC ..................................... G06F 1/26; G06F 1/32
See application file for complete search history.

(56) References Cited

U.S. PATENT DOCUMENTS 5,063,581 A * 11/1991 Akimoto ........... H01L 27/14831
377/58
5,625,550 A * 4/1997 Leggate ............ H02M 7/53875
318/811
8,513,974 B1 8/2013 Van Dyken
10,162,032 B2 * 12/2018 Bielmeier ............ G01R 33/543
2002/0008489 A1 * 1/2002 Laurent ................... H02P 6/085
318/599
2007/0255547 A1 * 11/2007 Estep ..................... G06F 30/20
703/15

(Continued)

FOREIGN PATENT DOCUMENTS

WO WO2017/023463 2/2017
WO WO2018/125547 7/2018

OTHER PUBLICATIONS

Whatmough et al, "Analysis of Adaptive Clocking Technique for Resonant Supply Voltage Noise Mitigation," Research Gage, Jul. 2015, 7 pages.

(Continued)

*Primary Examiner* — Phil K Nguyen
(74) *Attorney, Agent, or Firm* — Fish & Richardson P.C.

(57) ABSTRACT

Systems and methods for resonance aware performance management of processing devices. In one aspect, a method includes iteratively testing a performance operation for the processing device, wherein each iteration is performed at an iteration voltage level for a power delivery network. The performance operation is applied at different application periods and at the iteration voltage level for the iteration. If not failure condition is met, the iteration voltage is reduced and another iteration is done. Upon a failure occurring at a particular application period, an operational voltage level for the power delivery network that is based on the iteration voltage level for the iteration in which a failure condition was induced is selected, and application of the performance operation at the particular application period is precluded.

22 Claims, 3 Drawing Sheets

(56) References Cited

U.S. PATENT DOCUMENTS

| | | | |
|---|---|---|---|
| 2013/0318334 A1* | 11/2013 | Waskiewicz, Jr. | G06F 9/4812 |
| | | | 712/244 |
| 2014/0152278 A1 | 6/2014 | Shepard et al. | |
| 2015/0089315 A1 | 3/2015 | Alcocer Ochoa et al. | |
| 2015/0247899 A1 | 9/2015 | Sofer et al. | |
| 2016/0179173 A1* | 6/2016 | Eastep | G06F 1/3234 |
| | | | 713/320 |
| 2017/0345619 A1* | 11/2017 | Ohtake | H01J 37/32165 |
| 2017/0357298 A1* | 12/2017 | Hovis | G06F 1/3206 |
| 2018/0267585 A1* | 9/2018 | Allen-Ware | G06F 1/3203 |

OTHER PUBLICATIONS

Smith et al, "Principles of Power Integrity for PDN Design," Teledyne Lecroy EverywhereYouLook, 2018, 75 pages.

Pant, "Design and Analysis of Power Distribution Networks in VLSI Circuits," Samjay Pant University of Michigan, 2008, 205 pages.

Smith et al, "Chip-Package Resonance in Core Power Supply Structures for a High Power Microproccessor," citeserrx, Jul. 2001, 6 pages.

Shayan et al, "Resonance-aware Methodology for System Level Power Distribution Network Co-Design," Apache-da, 2009, 4 pages.

Novak, "Calculating Basic Resonance in the PDN," Electrical-Integrity, Jan. 2010, 4 pages.

EP Office Action in European Application No. 19207892, dated Mar. 25, 2020, 7 pages.

\* cited by examiner

RESONANCE AWARE PERFORMANCE MANAGEMENT

BACKGROUND

Altering the processing performance of a processing device is widely used to manage power, current and work load on the processing device. For example, throttling may be used to reduce power and current consumption in an integrated circuit. Such performance management is done by a performance operation, such as clock swallowing or a zero op. However, when such operations are executed, the load current may change abruptly. Additionally, because these operations are applied repeatedly, the periodicity or frequency of the application of the operation may naturally stimulate resonance in a power delivery network from which the processing device draws power. This can result in excessive voltage drop during resonance, which, if not managed, can result in power related functional failures within the processing device.

One way to minimize such failures is to increase the operational voltage applied through the power delivery network by adding a voltage margin to a minimum amount of voltage necessary that is sufficient for the power delivery network to provide adequate power to the processing device. While adding voltage margin for a single device incurs only an incremental operating expense, the aggregate expense for hundreds of thousands of such devices can be significant. For example, a data center may employ hundreds of thousands of processing devices, and extra margin for each of these processing devices can significantly drive up the total operational costs of the data center.

SUMMARY

This specification describes technologies relating to resonance aware performance management of processing devices.

In general, one innovative aspect of the subject matter described in this specification can be embodied in methods that include the actions of initializing a voltage level for a power delivery network to an initial voltage level that is greater than a level that is sufficient for the power delivery network to provide adequate power to a processing device without inducing a power-related processing error, the processing device being connected to the power delivery network; iteratively applying a performance operation to the device, wherein each iteration is performed at an iteration voltage level for the power delivery network, where each iteration voltage level is different from each other iteration different voltage level, and the first iteration voltage level is set to the initial voltage level, each iteration comprising: applying the performance operation to the processing device at a plurality of different repetitive sequences, for each repetitive sequence, determining whether the performance operation applied to the processing device at the repetitive sequence induces a failure condition in the processing device, if the performance operation does not induce a failure condition in the processing device at any of the repetitive sequences, reducing the iteration voltage level by a step amount, and performing another iteration, and if the performance operation does induce a failure condition in the processing device at any one of the repetitive sequences, ceasing the iterative testing; in response to ceasing the iterative testing: selecting an operational voltage level for the power delivery network that is based on the iteration voltage level for the iteration in which the failure condition was induced; determining a resonance parameter value based on the application of the performance operation at the repetitive sequence for which the failure condition was induced in the processing device; and based on the resonance parameter value, precluding application of performance operations in a manner that causes a failure condition to occur. Other embodiments of this aspect include corresponding systems, apparatus, and computer programs, configured to perform the actions of the methods, encoded on computer storage devices.

In general, another aspect of the subject matter described in this specification can be embodied in a device that includes a power delivery network, and a processing device connected to the power delivery network to receive power from the power delivery network and a performance management subsystem connected to the processing device and configured to perform a performance operation to alter processing performance of the processing device, the performance management system including logic that is configured to cause the performance management system to apply the performance operation at a plurality repetitive sequences, and to preclude application of the performance operation at a particular repetitive sequence that is different from each of the plurality of different repetitive sequences; wherein the power delivery network is configured to provide power to the processing device at an operational voltage level that is selected based on the application of the performance operation at the particular repetitive sequence inducing a failure condition in the processing device; and application of the performance operation at each of the plurality of different repetitive sequences does not induce a failure condition in the processing device.

Particular embodiments of the subject matter described in this specification can be implemented so as to realize one or more of the following advantages. Because the system determines particular application periods or patterns at which a performance operation will excite resonance in the power delivery network, the performance operations are not applied at the application periods. Moreover, each device (power delivery network and associated processing device connected to the power delivery network) can be individually tested to determine a specific minimum operating voltage ($V_{min}$) for the processing device. This results in a smaller voltage margin than would be required without such testing, which, in turn, results in costs savings. Additionally, power related failures due to power delivery network resonance are reduced or eliminated.

Additionally, the application periods or patterns can be used to determine a resonant frequency of the power delivery network. Thus, the system may then be able to monitor signals of the processing device for a periodicity (e.g., certain pulse trains over a given time period) that corresponds to the resonant frequency, and preclude application of performance operations in a manner that results in a signal that corresponds to the resonant frequency of the power delivery network. Thus, performance operations that have not been specifically tested can still be used in a manner that does excite resonance in the power delivery network.

In some implementations, devices need not be tested prior to deployment.

Instead, a performance management system can receive voltage and status feedback from the processing device and learn the combination of the minimum operational voltage $V_{min}$ and precluded application periods or patterns over time. This also results in a smaller voltage margin than would be required without such learning, which, in turn, results in costs savings.

In some implementations, once test statistics are collected for a processing device, e.g., different $V_{min}$ for different application periods or patterns, a voltage can be increased beforehand for aggressive transient load currents to make sure that the system has enough margin for the transient load currents, and then reduced when such load current are no longer present, thereby saving power.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The subject matter of this written description runs a series of power delivery network characterization tests to establish a power delivery network resonance parameter value and a minimum voltage $V_{min}$ for the power delivery network. As used in this specification, a resonance parameter value is data that is used by a performance management system to preclude application of a performance operation in a manner that causes resonance in the power delivery network. The resonance parameter value can be a value that specifies a resonance frequency, a vector that describes a prohibited application pattern of an operation that causes resonance, or any other data or value that can be used by a performance management system to preclude applying performance operations in a manner that will induce resonance in a power delivery network.

Once determined, the resonance parameter value is used to tailor throttling or any other performance adjustment to ensure that the power delivery network resonance is not stimulated. For example, after testing, the system precludes application of performance operations in a pattern that has been determined to excite resonance in the power delivery network.

These features and additional features are described in more detail below.

Figure 1:
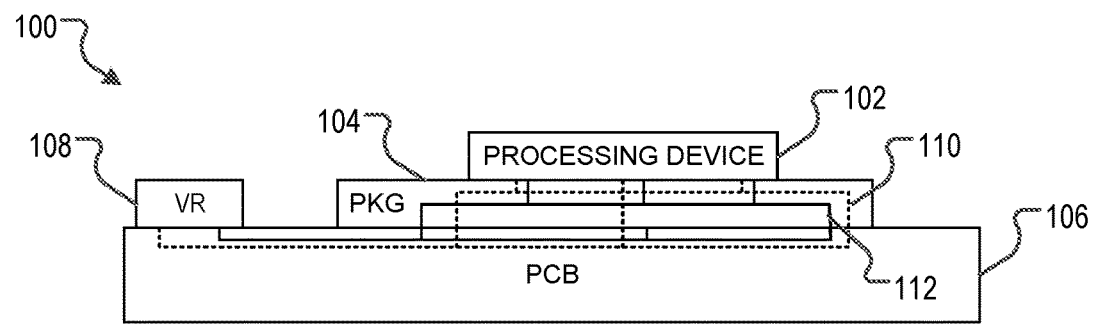
FIG. 1 is a block diagram of a device that includes a processing device for which performance can be adjusted by performance operations.

FIG. 1 is a block diagram of a device 100 that includes a processing device 102 for which performance can be adjusted by performance operations. The processing device 102 is typically a die that is connected to packaging 104, which, in turn, is connect to a printed circuit board 106. The printed circuit board 106 includes a voltage regulator 108 that provides power supply voltages though conductors, e.g., conductors 110 and 112. For the sake of simplicity in the illustrations, other components such as capacitors, inductors, resistors, ground planes and other passive and active components are omitted from the drawings. As used in this specification, the power delivery network includes the printed circuit board 106 and includes the interconnects in the power supply path from the voltage regulator 108 (or multiple voltage regulators) to the packaging 104 and processing device 102.

During operation of the processing device 102, various performance operations may be applied to the processing device 102. These operations may be applied to reduce peak current, reduce temperature, or any other reason that is appropriate for altering performance of the processing device 102. Examples of such operations include clock swallowing, zero op insertions, and the like. Other performance operations to increase or decrease performance of the processing device 102 may also be used.

Figure 2:
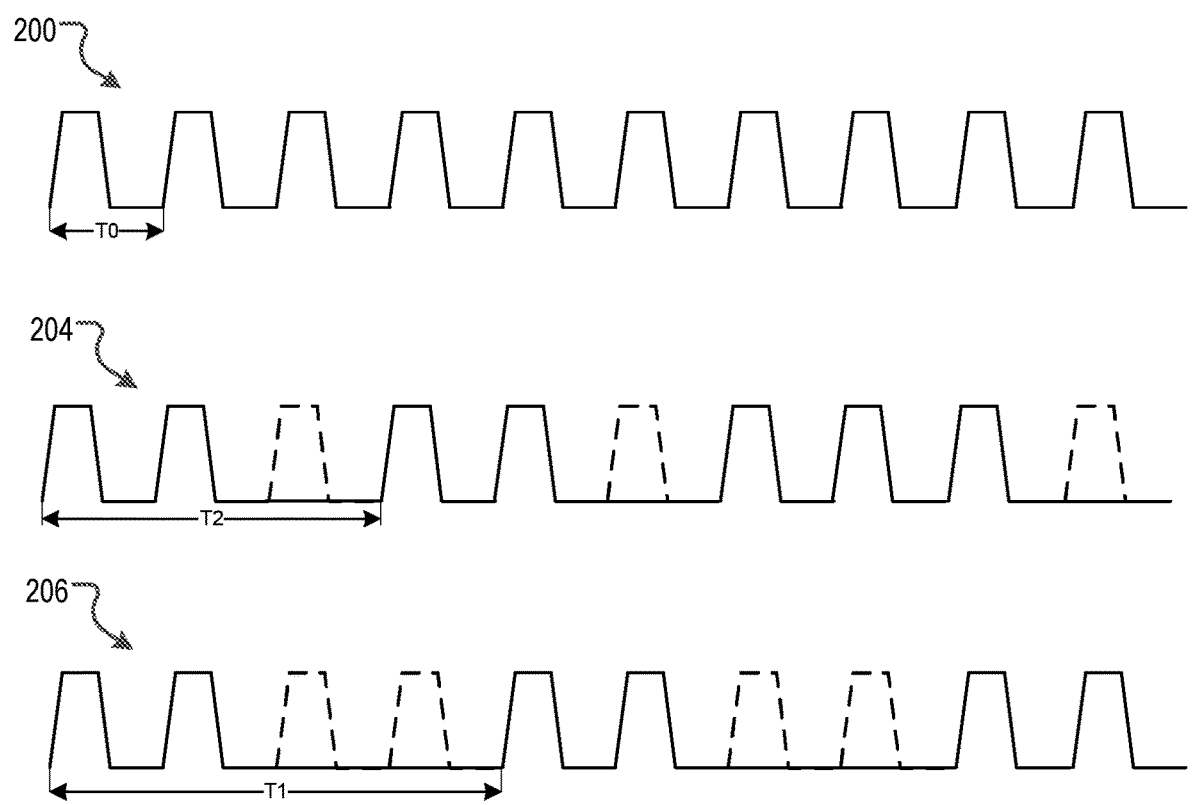
FIG. 2 is a set of timing diagrams illustrating the application of a performance operation at two different sequences.

Often the performance operations are applied according to various sequences, examples of which are shown in FIG. 2, which is a set of timing diagrams illustrating the application of a performance operation at two different sequences. The timing diagram 200 illustrates a system clock with a period of T0. This is an unaltered system clock that may be used, for example, when the processing device 102 is to be operated at full capacity.

The timing diagram 204 illustrates the same system clock, but with one clock pulse of every three swallowed, as indicated by the dashed clock pulses. This effectively reduces the capacity of the processing device by 33%. Such an application of a performance operation according to this pattern-every third clock pulse swallowed-may be used to reduce temperature in the processing device 102. The period of this pattern is T1, which is equal to 3*T0. The timing diagram 206 illustrates the same system clock, but with two clock pulses swallowed, as indicated by the dashed clock pulses. Here the period is T2, which is equal to 4*T0.

Figure 3:
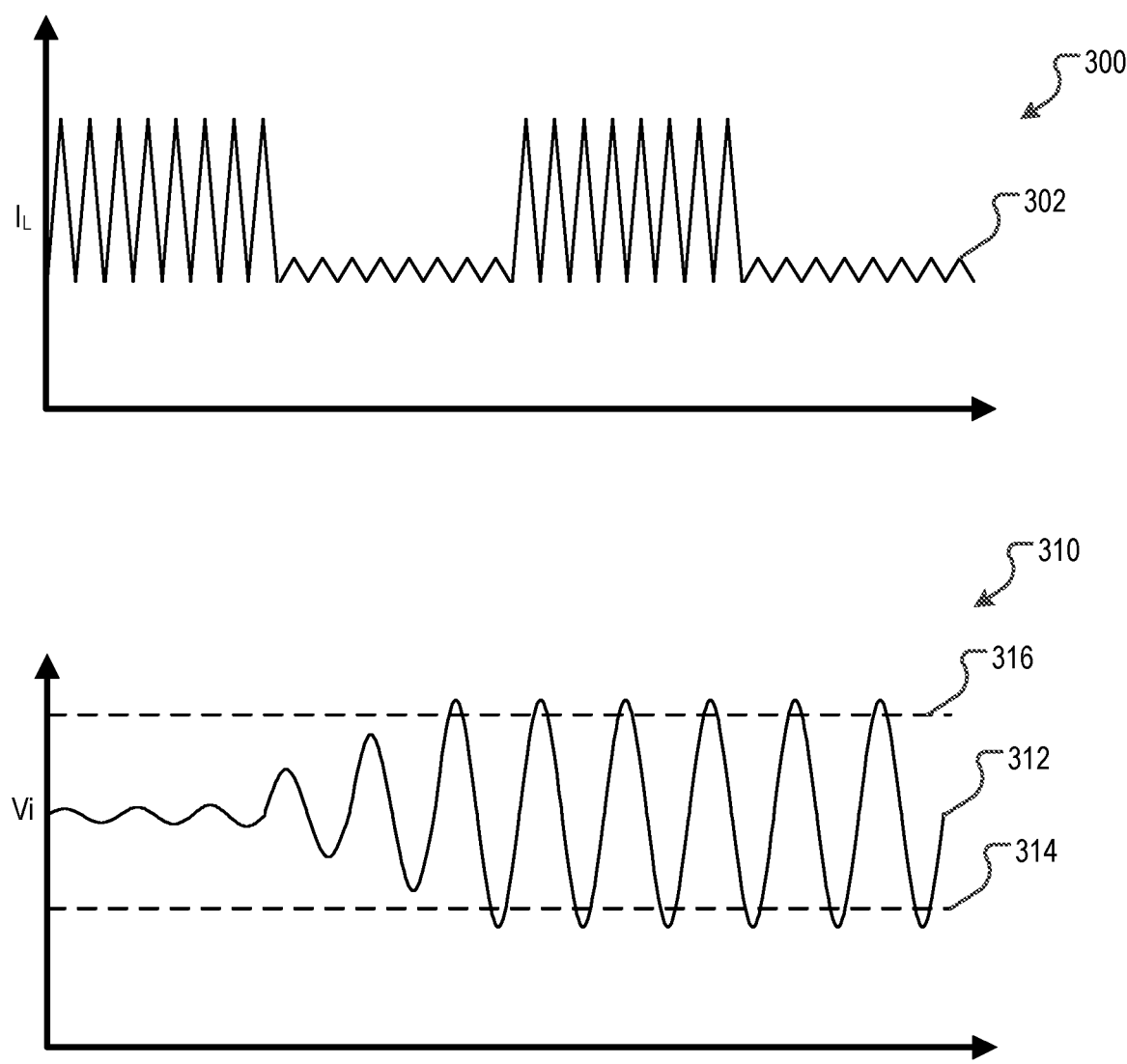
FIG. 3 are timing diagrams of a load current and a corresponding induced resonance resulting from the application of a performance operation in a manner that causes resonance in the power delivery network.

Due to the swallowing of clock pulses, the load current in the processing device 102 will be reduced for the duration for which the swallowing operations are applied to the processing device 102. However, altering the load current according to a certain application pattern may result in frequency components that excite resonance in the power delivery network. This is illustrated in FIG. 3, which illustrates timing diagrams of a load current and a corresponding induced resonance resulting from the application of a performance operation in a manner that causes resonance in the power delivery network. Timing diagram 300 includes a trace 302 that illustrates the load current IL over time. Such a load current may, for example, be the result of the application of the clock swallowing operation according to the pattern illustrated in timing diagram 206 of FIG. 2.

This particular load current results in resonance excitation in the power delivery network, and the resulting voltage $V_i$ in the power delivery network is illustrated in timing diagram 310. Over time, the voltage $V_i$ experience resonance, as illustrated by the increasing sinusoidal perturbation in the voltage trace 312. A voltage on the power delivery network that is less than a droop threshold 314 may result in a power-related processing error in the processing device 302.

One way to mitigate voltage droop induced errors is to add a DC margin to the voltage $V_i$. However, while the margin may eliminate or reduce power-related processing errors resulting from resonance, the resulting higher voltage increases power consumption, which, in turn, increases total operational costs. The resonance aware performance management described in this written description overcomes or reduces this inefficiency by reducing the amount of margin required for the input voltage $V_i$ by learning the resonance characteristics of the power delivery network and then precluding the application of performance operations in a manner than excites resonance in the power delivery network. Accordingly, because resonance conditions are reduced or eliminated, the resulting input voltage margin can be reduced.

Figure 4:
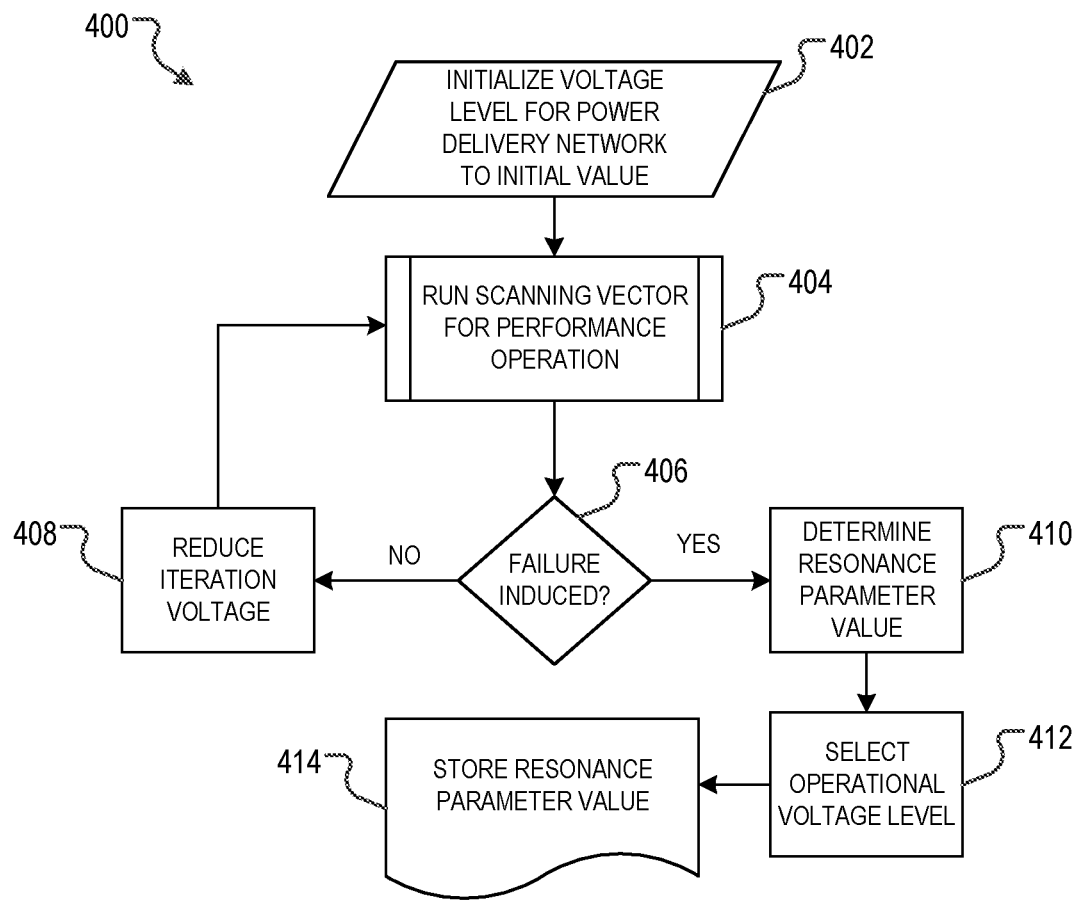
FIG. 4 is a flowchart of an example process to determine a resonance parameter value and a corresponding minimum operational voltage $V_{min}$.

FIG. 4 is a flowchart of an example process 400 to determine a resonance parameter value a corresponding minimum operational voltage $V_{min}$. The process 400 may be performed in a computer-controlled testbed that is configured to control the voltage of the power delivery network and control the application of various performance operations to the processing device 102. The processing device 102 may execute a test process during the process 400, where the test process causes the processing device 102 to perform at a particular capacity, e.g., at a rated capacity of power consumption, for example.

The process 400 initializes a voltage level for a power delivery network to an initial voltage level. The initial voltage level is greater than a level that is sufficient for the power delivery network to provide adequate power to the processing device 102 without inducing a power-related processing error. For example, assume that the minimum input voltage for the processing device is 1.0 V; the power delivery network may be initialized to 1.3 V.

The process 400 runs a scanning vector for a performance operation (404). The scanning vector defines testing data for sweeping a number of different periods (or application patterns) of a performance operation. One way of doing this is applying the performance operation to the processing device 102 at a number of different repetitive sequences. For example, for a clock swallowing operation, 100 patterns may be tested. First, every 100$^{th}$ pulse may be swallowed; then every 99$^{th}$ and 100$^{th}$ pulse may be swallowed, and so on, until only one pulse out of every 100 is not swallowed. Other patterns may also be used, each with different periods.

The process 400 determines if a failure was induced for the scanning vector (406). For example, for each repetitive sequence, the process determines whether the performance operation applied to the processing device 102 at the repetitive sequence induces a failure condition in the processing device 102. If a failure is not induced, another sequence is tested, until either a failure occurs or the sequences are exhausted.

If the performance operation does not induce a failure condition in the processing device 102 at any of the repetitive sequences, the process 400 reduces the iteration voltage level by a step amount, resulting in a different iteration voltage. For example, assuming the voltage was initialized at 1.3V for the first iteration and the scanning vector was successfully run, the iteration voltage may be reduce by 50 mV, e.g., to 1.25 V. The process beings performing another iteration at 404.

Conversely, if the performance operation does induce a failure condition in the processing device 102 at any one of the repetitive sequences, the iterative testing ceases. What constitutes a failure condition can vary. For example, a failure condition may occur when the voltage on the power delivery network exceeds and overshoots a threshold amount, e.g., is greater than the threshold 316 of FIG. 3. The overshoot threshold amount may be a scalar value, or may be a percentage of the input voltage. Alternatively, the failure condition may occur when the voltage on the power delivery network is less than the droop threshold amount, e.g., is less than the threshold 314 of FIG. 3. The droop threshold amount may also be a scalar value, or may be a percentage of the input voltage. In yet another alternative, the failure condition may occur when the process device 102 experiences a processing error, which, during such testing, is likely due to resonance-induced noise on the input voltage. Other failure conditions can also be used, as can combinations of various failure conditions.

In response to ceasing the testing due to the processing error, the process 400 determines a resonance parameter value (410). As described above, the resonance parameter value is data that is used by a performance management system to preclude application of a performance operation in a manner that causes resonance in the power delivery network. In some implementations, a resonance parameter value can be a value that specifies a resonance frequency or period. For example, with reference to FIG. 2, the period T1 of timing diagram 206 may define a resonance frequency. Likewise, the period of the resulting load current in the timing diagram 302 may be measured to determine a resonance frequency. Alternatively, the parameter value may be a vector that describes a prohibited application pattern of an operation that causes resonance. For example, with reference to FIG. 2, for a clock swallowing operation, the process may generate a resonance parameter value that specifies the application pattern of the timing diagram 206, i.e., for every four clock pulses, swallow every third and fourth clock pulse. Any other data or value that can be used by a performance management system to preclude applying performance operations in a manner that will induce resonance in a power delivery network can also be used.

Also in response to ceasing the testing due to the failure condition, the process 400 selects, for the device, an operational voltage level (412). The operational voltage level is for the power delivery network and is based on the iteration voltage level for the iteration in which the failure condition was induced. The power delivery network is then configured to provide power at the selected operational voltage level. The operational voltage that is selected is, in some implementations, the operational voltage level for the power delivery network for the interation during which the performance operation induced a failure condition in the processing device 102. In other implementations, a step margin may be implemented, and the operational voltage level that is selected the iteration voltage level of an iteration immediately prior to the iteration during which the performance operation induced a failure condition in the processing device 102.

The resonance parameter value is then stored (414). For example, a performance management system may access the resonance parameter value to tailor throttling or any other performance adjustment to ensure that the power delivery network resonance is not stimulated. This enables the performance management system to preclude application of performance operations in a pattern that has been determined to excite resonance in the power delivery.

In some implementations, precluding application of performance operations in a manner that causes a failure condition to occur may include monitoring, during application of performance operations, a period of a signal resulting from the application of the performance operation. When the monitored period of the signal is equal to the period that causes a failure condition to occur, a period of the application of the performance operation is adjusted so the periods no longer match. In other words, a signal with a certain periodicity may be avoided to preclude resonance. The signal that is monitored may be, for example, a clock signal, or a corresponding load signal.

Figure 5:
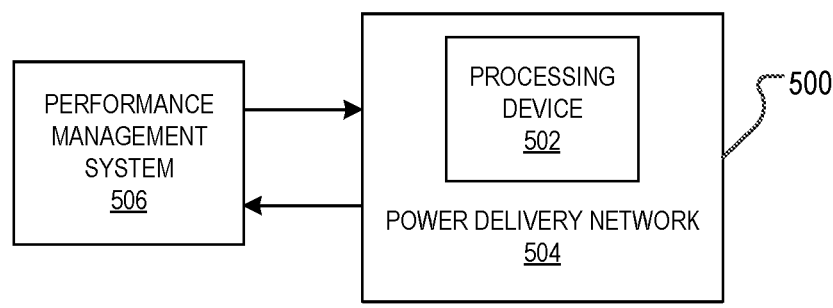
FIG. 5 is a block diagram of a performance management system and a device that has its operation controlled, in part, by the performance management system.

FIG. 5 is a block diagram of a performance management system 506 and a device 500 that has its operation controlled, in part, by the performance management system 506. The device 500 may be that which is described in FIG. 1, for example. The performance management system 506 may be any computer or processing device that is programmed to manage performance of one or more processing devices 502. As described above, for a particular device 500, the performance management system 506 may access a resonance parameter value for the device 500 and, based on this value, tailor throttling or any other performance adjustment to ensure that the power delivery network resonance is not stimulated.

In some implementations, the performance management system 506 can receive voltage and status feedback from the processing device 502 and learn the combination of the minimum operational voltage $V_{min}$ a precluded application patterns over time. This also results in a smaller voltage margin than would be required without such learning, which, in turn, results in costs savings. For example, each time the performance management system 506 applies a pattern of performance operations, the performance management system 506 monitors for a failure condition. The failure conditions that are monitored may be those described above. Over time, if no failures occur, the performance management system 506 may reduce the power delivery network by a step amount, and then again begin to monitor for failure conditions. Eventually, a failure occurs during the application of a performance operation according to a particular sequence. The performance management system 506 may then set the minimum power deliver network voltage to the current voltage (or increase it by a step margin), and preclude further application of the performance operation according to the pattern.

In some implementations, based on test statistics that are collected for a processing device, e.g., different Vmin for different application periods or patterns, different margins can be determined for different transients. The performance management system 506 can thus increase a voltage prior to operations being applied that induce large transient load currents. This ensures that the voltage for the processing device 502 has enough margin for the transient load currents. The performance management system 506 can then reduce the voltage when such load current is eliminated, thereby saving power.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   initializing a voltage level for a power delivery network to an initial voltage level that is greater than a level that is sufficient for the power delivery network to provide adequate power to a processing device without inducing a power-related processing error, the processing device being connected to the power delivery network;
   iteratively applying a performance operation to the processing device, wherein each iteration is performed at an iteration voltage level for the power delivery network, where each iteration voltage level is different from each other iteration different voltage level, and the first iteration voltage level is set to the initial voltage level, each iteration comprising:
      applying the performance operation to the processing device at a plurality of different repetitive sequences;
      for each repetitive sequence, determining whether the performance operation applied to the processing device at the repetitive sequence induces a failure condition in the processing device;
      if the performance operation does not induce a failure condition in the processing device at any of the repetitive sequences, reducing the iteration voltage level by a step amount, and performing another iteration; and
      if the performance operation does induce a failure condition in the processing device at any one of the repetitive sequences, ceasing the iterative testing;
   in response to ceasing the iterative testing:
      selecting an operational voltage level for the power delivery network that is based on the iteration voltage level for the iteration in which the failure condition was induced;
      determining a resonance parameter value based on the application of the performance operation at the repetitive sequence for which the failure condition was induced in the processing device; and
      based on the resonance parameter value, precluding application of performance operations in a manner that causes a failure condition to occur.

2. The computer-implemented method of claim 1, wherein:
   applying the performance operation to the processing device at a plurality of different repetitive sequences comprises applying the performance operation to the processing device at a plurality of different application periods and at the iteration voltage level for the iteration;
   determining whether the performance operation applied to the processing device at the repetitive sequence induces a failure condition in the processing device comprises determining whether the performance operation applied to the processing device at an application period induces a failure condition in the processing device; and
   determining a resonance parameter value based on the application of the performance operation at the repetitive sequence comprises determining a resonance parameter value based on the application period during which a failure condition was induced in the processing device.

3. The computer-implemented method of claim 2, wherein precluding application of performance operations in a manner that causes a failure condition to occur comprise:
   monitoring, during application of performance operations, a period of a signal resulting from the application of the performance operation; and
   adjusting a period of the application of the performance operation to change the period of the signal when the monitored period of the signal is equal to the period that causes a failure condition to occur.

4. The computer-implemented method of claim 3, wherein the signal is a clock signal.

5. The computer-implemented method of claim 3, wherein this signal is a load current signal.

6. The computer-implemented method of claim 2, wherein determining whether the performance operation applied to the processing device at the application period induces a failure condition in the processing device comprises:
   determining that an operational error occurs in the processing device while the performance operation is applied to the processing device at the application period.

7. The computer-implemented method of claim 2, wherein determining whether the performance operation applied to the processing device at the application period induces a failure condition in the processing device comprises:
   measuring a voltage level on the power delivery network while the performance operation is applied to the processing device at the application period;
   determining that the voltage level on the power delivery network changes by at least a threshold amount while the performance operation is applied to the processing device at the application period; and
   in response to determining that the voltage level on the power delivery network changes by at least the threshold amount while the performance operation is applied to the processing device at the application period, determining the performance operation applied to the processing device at the application period induces the failure.

8. The computer-implemented method of claim 7, wherein the voltage level on the power delivery network is the iteration voltage level.

9. The computer-implemented method of claim 7, wherein the determining that the voltage level on the power delivery network changes by at least the threshold amount while the performance operation is applied to the processing device at the application period comprises determining whether the voltage level on the power delivery network increases by at least an overshoot threshold amount.

10. The computer-implemented method of claim 7, wherein the determining that the voltage level on the power delivery network changes by at least the threshold amount while the performance operation is applied to the processing device at the application period comprises determining whether the voltage level on the power delivery network decreases by at least a droop threshold amount.

11. The computer-implemented method of claim 1, further comprising:
configuring the power delivery network to provide the selected operational voltage; and
preclude application of the performance operation at the repetitive sequence at which the failure condition was induced.

12. The computer-implemented method of claim 2, wherein the operational voltage level selected for the power delivery network is the iteration voltage level of the iteration during which the performance operation induced a failure condition in the processing device at an application period.

13. The computer-implemented method of claim 2, wherein the operational voltage level selected for the power delivery network is the iteration voltage level of an iteration immediately prior to the iteration during which the performance operation induced a failure condition in the processing device at an application period.

14. The computer-implemented method of claim 1, wherein the performance operation is a clock swallowing operation.

15. The computer-implemented method of claim 1, wherein the performance operation is a zero op operation.

16. A device, comprising:
a power delivery network;
a processing device connected to the power delivery network to receive power from the power delivery network; and
a performance management subsystem connected to the processing device and configured to perform a performance operation to alter processing performance of the processing device, the performance management system including logic that is configured to cause the performance management system to apply the performance operation at a plurality repetitive sequences, and to preclude application of the performance operation at a particular repetitive sequence that is different from each of the plurality of different repetitive sequences;
wherein:
the power delivery network is configured to provide power to the processing device at an operational voltage level that is selected based on the application of the performance operation at the particular repetitive sequence inducing a failure condition in the processing device; and
application of the performance operation at each of the plurality of different repetitive sequences does not induce a failure condition in the processing device.

17. The device of claim 16, wherein the failure condition in the processing device comprises an operational error the processing device occurring while the performance operation is applied to the processing device at the particular repetitive sequence.

18. The device of claim 16, wherein the failure condition in the processing device comprises a voltage level on the power delivery network changing by at least a threshold amount while the performance operation is applied to the processing device at the particular repetitive sequence.

19. The device of claim 18, wherein the threshold amount is an overshoot threshold amount.

20. The device of claim 18, wherein the threshold amount is droop threshold amount.

21. The device of claim 16, wherein the performance operation is a clock swallowing operation.

22. The device of claim 16, wherein the performance operation is a zero op operation.

* * * * *